June 27, 1961 J. E. GROVE ET AL 2,990,171
MOBILE, SEPARABLE WORK HOLDER
Filed Dec. 12, 1958 5 Sheets-Sheet 1

INVENTORS
JAMES E. GROVE
BY JOHN E. CHAMBERLAIN
ATTORNEY.

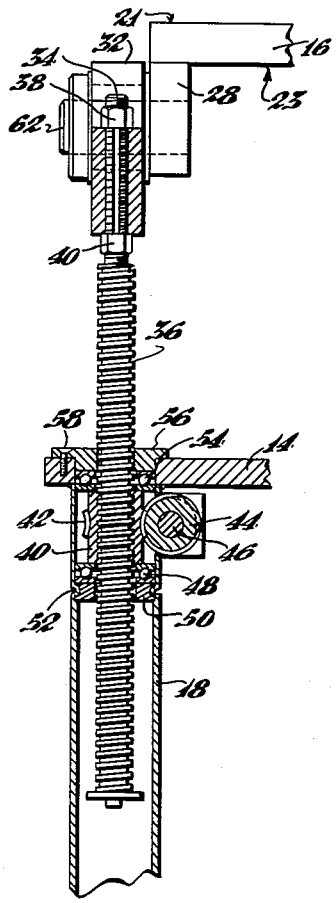
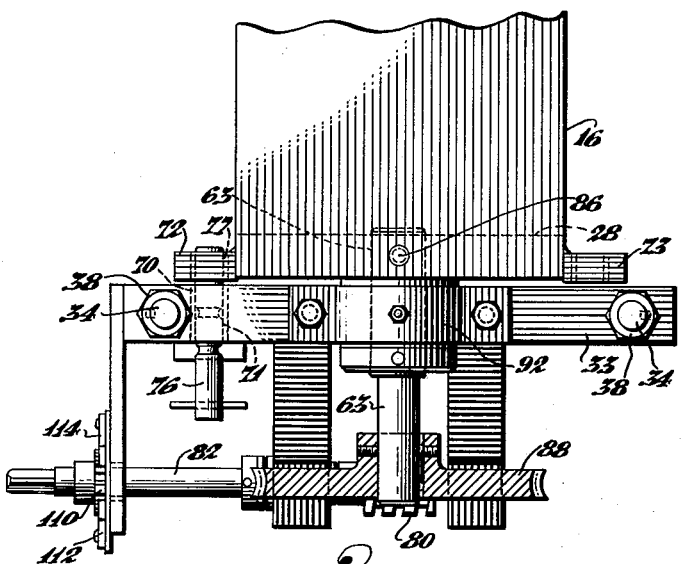
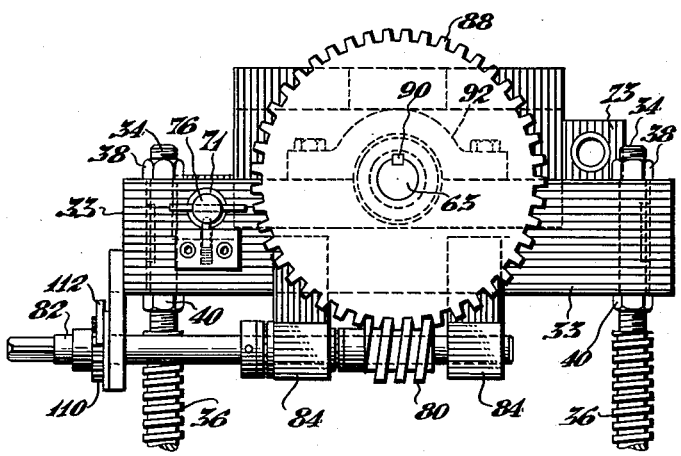
INVENTORS
JAMES E. GROVE
JOHN E. CHAMBERLAIN
BY
ATTORNEY.

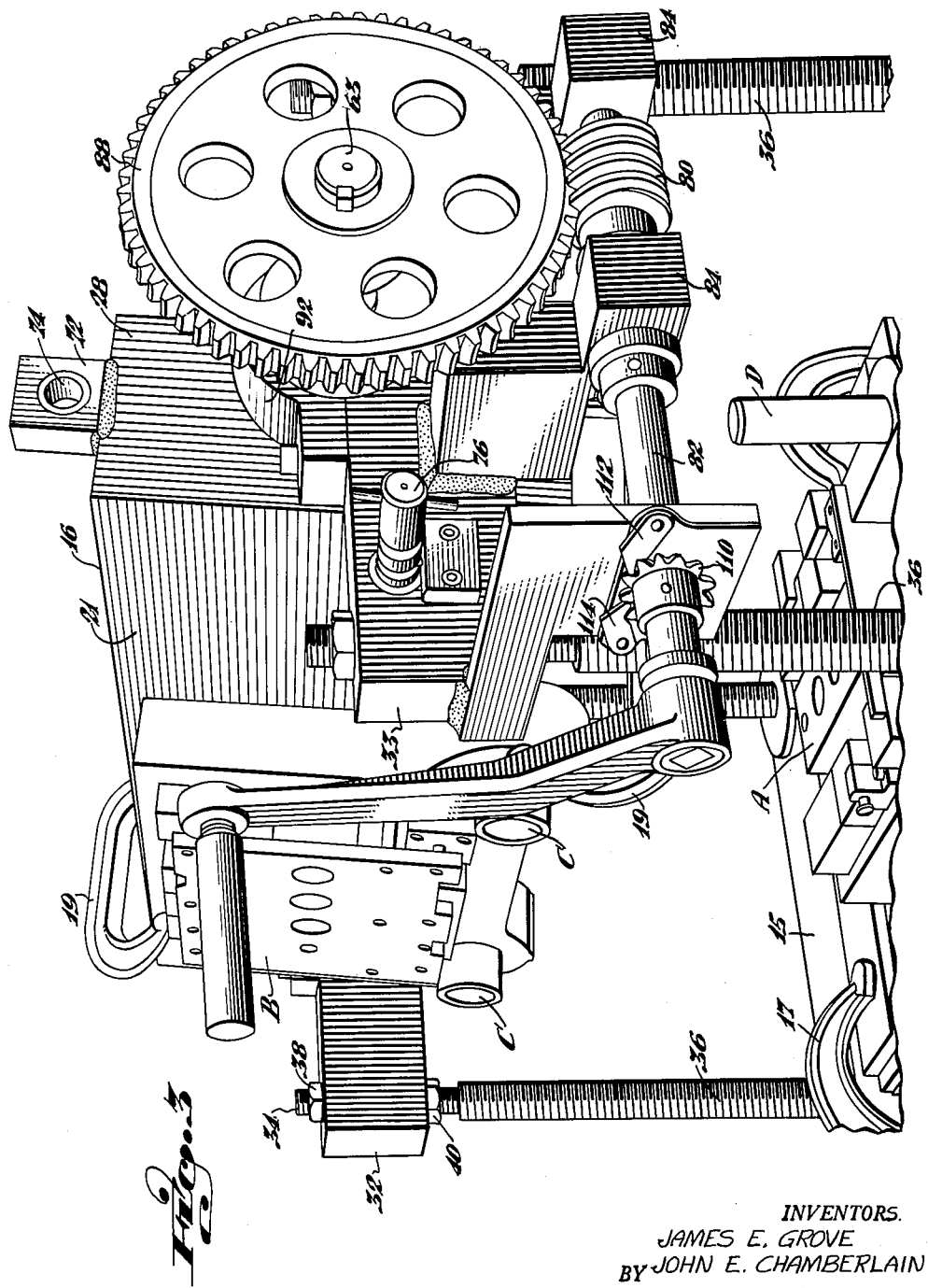

June 27, 1961  J. E. GROVE ET AL  2,990,171
MOBILE, SEPARABLE WORK HOLDER
Filed Dec. 12, 1958  5 Sheets-Sheet 4

INVENTORS
JAMES E. GROVE
BY JOHN E. CHAMBERLAIN
ATTORNEY.

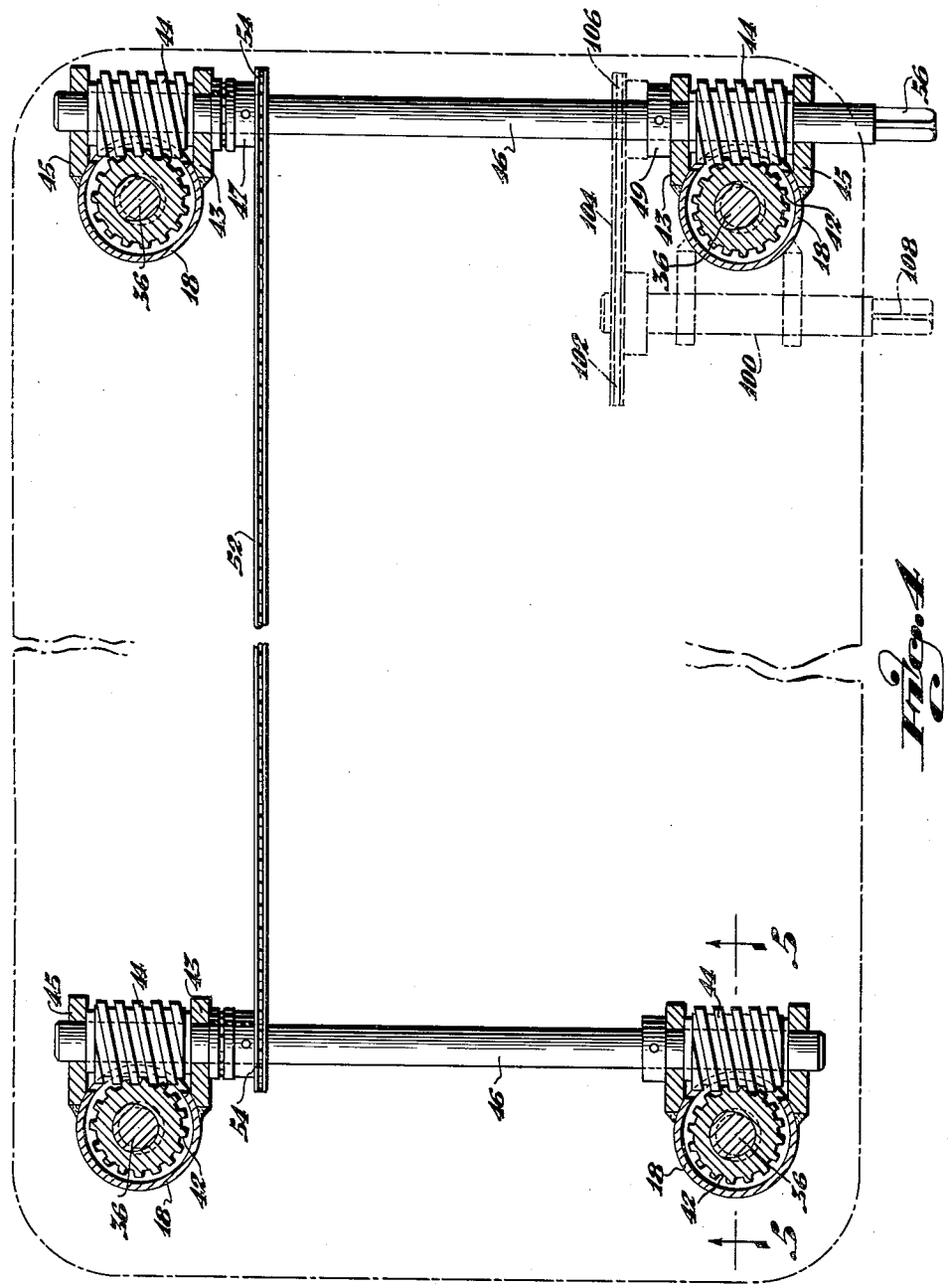

United States Patent Office 2,990,171
Patented June 27, 1961

2,990,171
MOBILE, SEPARABLE WORK HOLDER
James E. Grove, Hamilton, and John E. Chamberlain, Middletown, Ohio, assignors to The Hamilton Tool Company, Hamilton, Ohio, a corporation of Ohio
Filed Dec. 12, 1958, Ser. No. 779,904
8 Claims. (Cl. 269—107)

This invention relates to work holders and more particularly to work holders which are adapted for parting, or fitting or adjusting coacting working parts such as the male and female parts of dies, for example.

Particularly, the invention relates to a work holder that comprises a relatively stationary work supporting table and a vertically movable and rotatable work supporting member or platen so designed and arranged that working parts, such as the male and female parts of a die may be parted, or checked for alignment and wear, or adjusted as required.

An object of the invention is to provide a portable work supporting table having a flat upper surface, and a platen which is adjustably mounted above the table for controlled movement not only toward and away from the table, but for rotary movement relative thereto.

Another object of the invention is to provide a work table which includes means for moving the platen along an axis normal to the table top while maintaining the adjacent faces of the platen and table in absolute parallelism.

A further object of the invention is to provide a portable work table having the hereinabove described characteristics with means for enabling the platen to be turned about an axis parallel to and above the table for permitting objects secured to said platen to be inspected and/or worked upon. Then, after said articles have been inspected and/or worked upon, the platen may be returned to its original position, in parallelism with the table and in predetermined relationship with said table top.

Another object of the invention is to provide a portable work table having the hereinabove described characteristics wherein the platen is provided with a pair of opposed, parallel, flat, axial surfaces each of which may be alternately or selectively disposed in facing relationship with the surface of the table for providing different spacings from the table top, whereby the device is ideally adapted for handling die sets having different shut heights.

Another object of the invention is to provide a device having the hereinabove described characteristics which is particularly well adapted to move one part along an axis which is normal to another part, such as, by way of example, movement of a die punch relative to a die shoe, whereby to enable the said die elements to be carefully inspected and/or worked upon and then reassembled in precisely the same relative relationship they had prior to being initially separated.

A further object is to provide a holder as aforesaid that embodies an elevator means by which one work supporting member can be moved relative to the other whereby working parts may be parted, or the fit of the working parts can be checked, and which includes means for rotating the elevatable member to positions where the work carried thereby can be further checked, adjusted or corrected, as the case may be.

Still a further object of the invention is to provide a device having the hereinabove described characteristics which includes simple, yet rugged, trouble-free means for effecting the desired relative movement of the platen with reference to the table.

These and other objects are attained by the means described herein and as disclosed in the accompanying drawings in which:

FIG. 3 is an enlarged view in perspective of the rotatable work supporting member, its elevator mechanism and means for rotating the same.

FIG. 4 is a view in section taken on line 4—4 of FIG. 1.

FIG. 5 is a view in section taken on line 5—5 of FIG. 4.

FIG. 6 is a partial plan view partly in section showing one end of the rotatable work supporting member rotated 180° and working parts therefor.

FIG. 7 is a view in elevation of the assembly shown in FIG. 6.

Figure 1:
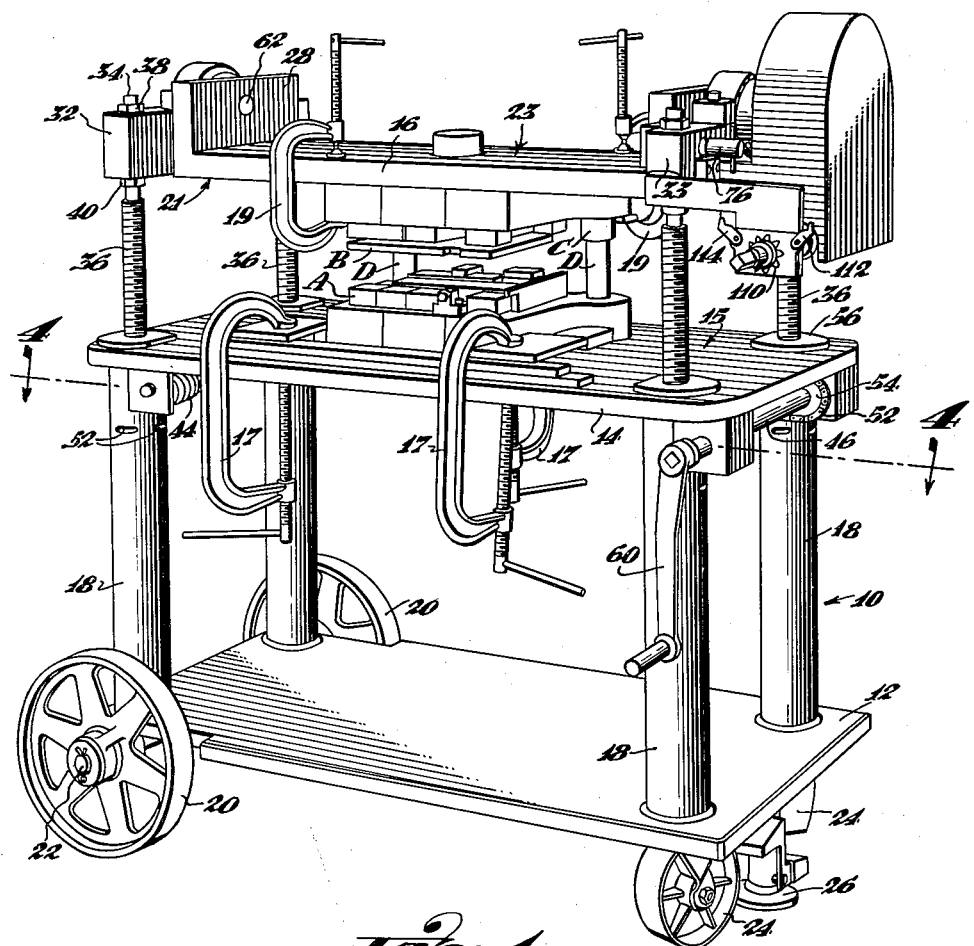
FIG. 1 is a view in perspective of a work holder and work manipulator arranged and constructed in accordance with an embodiment of the invention.
Figure 2:
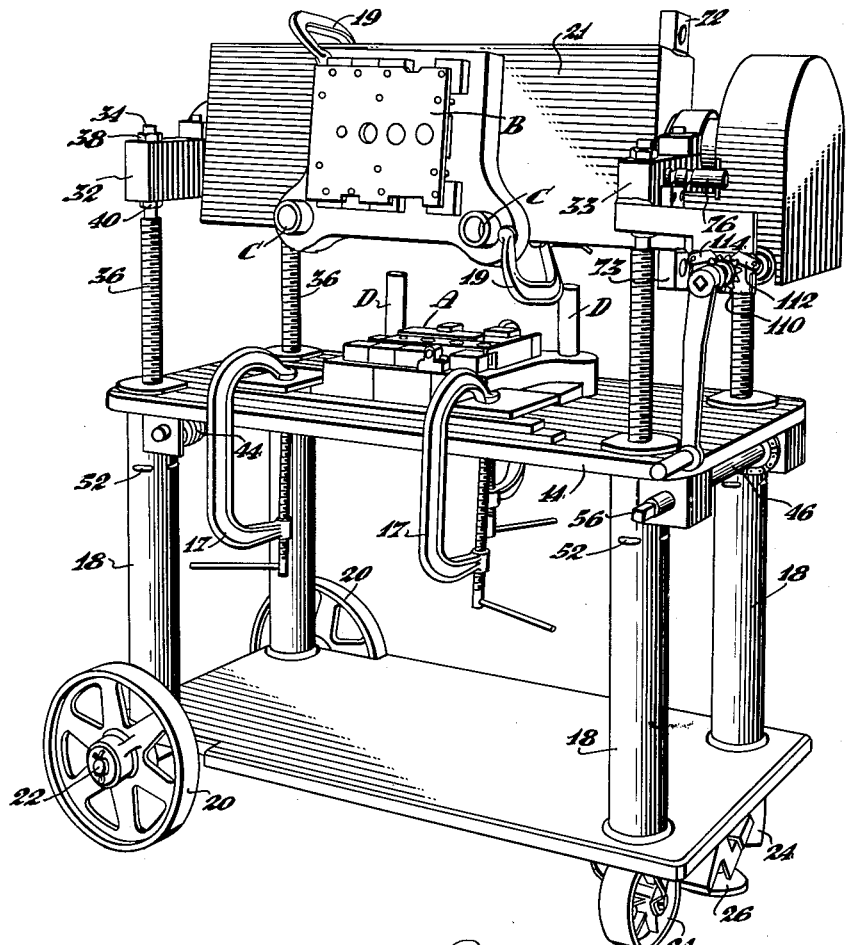
FIG. 2 is a view of the work holder showing one of the work supports or platen in an elevated and a rotated position.

With particular reference now to FIGS. 1 and 2, the numeral 10 denotes generally a commercial embodiment of a device embodying the teachings of the present invention, wherein the numeral 12 denotes a bottom plate, 14 a table, and 16 a platen, wherein the table and platen are each work supporting members.

In the preferred embodiment of the invention, bottom plate 12 and the table 14 are permanently and rigidly interconnected in spaced relationship such as, by way of example, by means of a series of hollow corner posts 18 the opposite ends of each of which are rigidly secured to members 12 and 14. The resultant framework may be rendered mobile by wheels 20 suitably journaled to a shaft 22 at one end of bottom plate 12 and by swivel casters 24 suitably fastened to the other end thereof. A clamp-down or locking mechanism 26 may be provided at the swivel-caster-supported-end of the framework for enabling it to be securely though releasably anchored in place incident to manipulation of element 26 to the position illustrated in FIG. 1.

Table 14 is fabricated from a rigid material to provide a support for heavy objects, such as, by way of example, a die assembly. The table is provided with an accurately machined, flat, axial top or upper surface 15 to which a die shoe A may be securely though releasably anchored by means of clamps 17, or the like.

In the preferred embodiment of the invention, the platen is fabricated from a rigid material and is provided with a pair of opposed, parallel, flat, axial surfaces 21 and 23, either of which may be disposed in facing relashionship with upper surface 15 of table 14 for permitting the die punch B of the die assembly to be securely through releasably anchored thereto by means of clamps 19, or the like.

The opposite ends of the platen terminate in offset members 28 which are pivotally mounted between a pair of laterally spaced platen supports or bridging members 32 and 33, each of which span and are securely though adjustably anchored to the upper ends 34 of a pair of jack screws 36 whereby elevation of said jack screws will result in elevation of bridging members 32 and the platen 16 carried thereby. Adjusting nuts 38 and 40 threadably engage the upper ends 34 of jack screws 36 for providing means by which each of the platen supports or spanning members 32 may be accurately aligned and maintained in parallelism with the upper face of table 14.

With reference now to FIGS. 4 and 5, it will be noted that jack screws 36 are mounted for axial endwise movement while being prevented from rotating; and that each of the four jack screws is simultaneously raised or lowered in synchronization or unison by reason of the driving means hereinafter more fully described.

A rotatable driving nut 40 is provided for each jack shaft, wherein each of said driving nuts is provided with an internally threaded bore dimensioned to receive the external threads of its associated jack shaft. Each of said driving nuts is provided with a worm wheel portion 42 which engages a worm wheel 44 secured in driven relationship to a cross or drive shaft 46. Each of the drive nuts rests upon a lower thrust bearing 48 carried by a plug 50 that may be secured to a column 18 such as, by way of example, inwardly projecting lug portions 52. The upper end of each nut is engaged by a thrust bearing 54 suitably retained by a cap plate 56 securely though releasably anchored relative to table 14 such as, by way of example, screws 58, or the like. From the foregoing, it will be noted that rotation of shaft 46 will cause worm gears 44 to be rotated, which will impart a rotary motion to drive nut 40 which will result in axial endwise shifting of its associated jack screw relative to the drive nut.

With particular reference now to FIG. 4, it will be noted that a pair of shafts 46 have been provided wherein said shafts are interconnected by means of a sprocket chain 52 which passes over sprocket wheels 54 which are rigidly affixed to shafts 46 whereby rotation of either of shafts 46 will result in all four of the jack screws being simultaneously raised or lowered in unison and in absolute parallelism, whereby the platen supports or bridging members 32 and 33 will be raised or lowered in unison while being maintained in absolute parallelism. Actuation of shafts 46 may be effected by means of flats 56 provided on the ends of one or both of shafts 46, said flats being engaged by a suitable crank 60 (FIG. 1).

With particular reference now to FIGS. 5 and 6, it will be noted that one of the platen offsets 28 is pivotally secured to or suspended from member 32 by a trunnion pin 62, whereas the other offset member is pivotally suspended from member 33 by stub shaft 63.

Trunnion pin 62 and stub shaft 63 are disposed in axial alignment in a plane in spaced parallelism with the upper surface of table 14.

It will be noted that the foregoing construction provides simple yet highly effective means for providing alternate spacing between the axial faces of the platen and table 14 depending upon which platen surface is facing the table. This feature permits dies of differing "shut heights" to be accommodated with the platen supports or bridging members 32 and 33 spaced a minimum distance from the table, which enhances the overall rigidity and stability of the device. In FIG. 1 surface 21 of the platen faces table 14 for producing a minimum spacing sufficient to accommodate the die illustrated; however, if the "shut height" of another die was appreciably higher than the one illustrated, the platen could be rotated through 180° for presenting surface 23 of the platen in facing relationship with the table. Quite obviously the spacing between the table and surface 23 is greater than the spacing between the table and surface 21 (before it was rotated through 180°) for the same setting of the platen supports or bridging members 32 and 33 relative to said table.

It will, of course, be understood that the platen may be thus rotated only when it has been elevated above table 14 by an amount sufficient to permit the front and rear edges of the platen and/or whatever is secured thereto, to clear the table and whatever might be mounted thereto.

A further very important feature of the present invention is the provision of means for selectively controlling the relative movement of the platen with reference to the spanning members 32 and 33, since it is imperative that the lower surface of the platen, when in the position illustrated in FIG. 1, be in spaced axial alignment with the upper surface of table 14, in order that movement of the platen relative to the table will be along an axis which is normal to the upper surface of the table.

With particular reference now to FIGS. 6 and 7, it will be noted that spanning member 33 has been provided with bore 70 having a bushing 71 therein for reception of locking pin 76.

In the preferred embodiment of the invention, a bore is drilled through ear or lug 72 rigidly affixed to the forward face of offset member 28 while axial face 21 of the platen is maintained in absolute parallelism with the top of table 14 whereby to insure perfect alignment of pin 76 with bushing 77 in said bore. In the same manner a bushing receptive bore is drilled through ear 73 which is rigidly affixed to the rear face of offset member 28 after the platen has been rotated 180° and while face 23 of the platen is maintained in absolute parallelism with the top of the table.

The locking pin 76 is secured relative to and mounted for endwise axial movement with respect to the axial bores in lugs 72 and 73. It will therefore be noted that when pin 76 is in engagement with the bore of lug 72, as in FIGS. 1 and 6, surface 21 of platen 16 will be rigidly and securely, though releasably, locked in facing parallelism with the table 14.

The platen may be rotated about its pivotal axis incident to withdrawal of pin 76 from the bore of ear 72 whereby a rotary motion may be imparted to worm wheel 80 by means of shaft 82 suitably journaled as at 84 in bearings secured to and carried by spanning member 33.

As best illustrated in FIGS. 6 and 7 stub shaft 63 is fixedly secured at one end to the offset 28 by means of a pin 86 and at its over end to worm wheel 88 by means of a key 90. Stub shaft 63 is suitably journaled as at 92 for rotary motion relative to the support member 33.

From the foregoing, it will be apparent that rotation of shaft 82 will rotate stub shaft 63 which will result in rotation of the platen about an axis above and parallel with the top of table 14.

As evident from FIGS. 2 and 3, lifting and then rotating the platen makes whatever objects are secured to and carried by it easily accessible for inspection, fitting, adjusting or other work, as the case may be; it being noted that while so positioned the entire device may be bodily transported from one place to another or from one machine tool to another, after which the objects so mounted may, upon rotation of the platen to permit the lock pin to again be seated within the bore of ear 72, be then vertically lowered relative to the table 14 and whatever cooperating objects are supported thereon.

As shown in FIG. 1, the lower half or die shoe A of the die set is fitted with the female parts of a die, whereas the upper half or die punch B of the die set is fitted with the punch or punches of the die.

As best illustrated in FIG. 2, the upper part of the die set is provided with guide bushings C that receive guide pins D mounted on the lower part of the set.

When the work holder is arranged as shown in FIG. 1, the guide pins D are in the guides C. By operating the platen elevating and lowering mechanism via crank 60, the male and female parts of the die may be brought slowly together to make it possible to check the fit and clearances. If adjustment is required, the platen 16 may be raised to elevated position and rotated such as to the position shown in FIG. 2. When so elevated, the guides C are disengaged from the pins D. In that position, the punch or punches of the die may be inspected, adjusted or fitted as required. The lower die set with its female die parts is also thereby made readily accessible for the same purposes. The platen may be rotated a full 360° to give full accessibility to the work on it.

Instead of using the device as a means for checking, inspecting or adjusting dies, it may also be used for fitting, checking, inspecting or adjusting other types of closely fitting working parts, or for parting and reassembling working parts having close tolerances.

As earlier explained, all four of the jack screws 36 are simultaneously actuated by rotating either of shafts 46 (FIG. 4). If a faster rate of movement of the platen is desired, a jack shaft 100 having a sprocket 102 for driving a chain 104 running on a sprocket 106 fast on shaft 46, may be employed. The sprocket 102 being larger than the sprocket 106, the shafts 46 will be driven at a higher speed when the jack shaft 100 is driven by means of a crank engaging flats 108 thereof.

As clearly illustrated in FIG. 4, shafts 46 are journaled in pairs of brackets 43 and 45 suitably secured to posts 18. The numerals 47 and 49 denote stop collars on shafts 46 to prevent endwise movement thereof.

In order to preclude accidental or unintentional rotary movement of the platen during those periods of time when the lock pin 76 is disengaged from ears 72 and 73, a spur gear 110 is secured to and carried by shaft 82, and a pair of pawls 112 and 114 are pivotally mounted for engagement with the gear, as in FIGS. 2 and 3, to positively prevent rotation of the shaft 82 until after the pawls have been shifted to the disengaged position of FIG. 1 by a deliberate act on the part of the operator. In this manner the platen may be releasably locked and maintained in any desired degree of turn relative to the table 14.

From the foregoing description, it should be apparent to those of ordinary skill in the art that various modifications and changes may be made in the illustrated embodiment without departing from either the spirit or the scope of the invention.

What is claimed is:

1. A device of the class described comprising in combination, a table having a flat upper surface, a platen having a pair of opposed, parallel, flat, axial surfaces, a pair of platen supports, means for synchronously moving said platen supports in parallel relationship to the upper surface of said table and for positively maintaining said platen supports in adjusted spaced parallel relationship with the upper surface of said table, means rotatably connecting said platen to and between said supports, means for releasably locking said platen with one or the other of its axial surfaces facing and in parallelism with the upper surface of said table, and means operable upon release of said last mentioned means for imparting a turning torque to said platen.

2. A device of the class described comprising in combination, a table having a flat upper surface, a platen having a pair of opposed, parallel, flat, axial surfaces, a pair of laterally spaced platen supports, means for synchronously moving said platen supports in parallel relationship to the upper surface of said table and for positively maintaining said platen supports in adjusted spaced parallel relationship with the upper surface of said table, offset means rotatably mounting said platen to said supports for rotation about an axis above and parallel with the upper surface of said table, said offset means automatically locating one of said facing axial surfaces closer to the upper surface of the table than the other, means for releasably locking said platen relative to said table with one or the other of its axial surfaces facing and in parallelism with the upper surface of said table, and means operable upon release of said locking means for rotating said platen about said axis.

3. A device of the class described comprising in combination, a table having a flat upper surface, a platen having a pair of opposed, parallel, flat, axial surfaces, a pair of laterally spaced platen supports, means for synchronously moving said platen supports in parallel relationship to the upper surface of said table and for positively maintaining said platen supports in adjusted spaced parallel relationship with the upper surface of said table, offset means rotatably mounting said platen to said supports for rotation about an axis above and parallel with the upper surface of said table, said offset means automatically locating one of said facing axial surfaces closer to the upper surface of the table than the other, means for releasably locking said platen relative to said table with one of the other of its axial surfaces facing and in parallelism with the upper surface of said table, means operable upon release of said locking means for rotating said platen about said axis, and means associated with said last mentioned means for locking said last mentioned means for maintaining said platen in rotated position and against accidental or unintentional movement therefrom.

4. A work holding device comprising a rigid frame including a table secured and maintained in fixed position, said table having a flat, horizontally disposed upper surface, support means carried by said frame including support members adjacent opposite ends of said table and vertical supporting columns positioning such members above said table, means carried by said frame and connected to said supporting columns for axially moving the same in unison so that said support members are raised and lowered thereby while maintaining a fixed angular disposition relative to said frame, a platen carried between said support members above and opposed to said table, said platen having a flat undersurface, means rotatably mounting said platen between said support members, and means engageable between at least one of said support members and the platen for releasably fixing said platen against rotation in a plurality of fixed positions with one of such fixed positions being such that said undersurface of the platen is opposed to and parallel with said upper surface of the table.

5. A work holding device comprising a rigid frame including a table secured and maintained in fixed position, said table having a flat, horizontally disposed upper surface, support means carried by said frame including support members adjacent opposite ends of said table and vertical supporting columns positioning such members above said table, means carried by said frame and connected to said supporting columns for axially moving the same in unison so that said support members are raised and lowered thereby while maintaining a fixed angular disposition relative to said frame, a platen carried between said support members above and opposed to said table, said platen having a flat undersurface, means rotatably mounting said platen between said support members, means engageable between at least one of said support members and the platen for releasably fixing said platen against rotation in a plurality of fixed positions with one of such fixed positions being such that said undersurface of the platen is opposed to and parallel with said upper surface of the table, said platen also having a flat upper surface, said means rotatably mounting the platen between the support members being offset whereby rotation of the platen 180° from said one fixed position will position the upper surface thereof in opposed, parallel relation to said upper surface of the table but in differently spaced relationship.

6. A work holding device comprising a rigid frame having a horizontally disposed table formed as an integral part thereof, said table having a flat, horizontally disposed upper surface, a platen disposed above said table and having a flat undersurface, means mounting said platen on said frame for vertical movement relative thereto and including mechanism constraining said platen to be so moved with the undersurface thereof disposed in opposed, parallel relationship to said upper surface of the table throughout the extent of such movement, said means including mechanism rotatably mounting said platen for rotation with respect to said mounting means about an axis parallel to and spaced above said table and mechanism for selectively locking said platen in a plurality of fixed positions relative to said table, one of which is as aforementioned with the undersurface of the platen parallel to the upper surface of the table.

7. The assembly as defined in claim 6 wherein said means includes a plurality of threaded columns threadedly engaged in said frame and having means associated therewith for rotating such columns in unison, support members carried by the upper ends of said columns and between which said platen is rotatably mounted, means carried by one of said support members for imparting rotational movement to said platen.

8. The assembly as defined in claim 7 in which said frame includes a plurality of upright corner posts, said threaded columns being extensible from said corner posts.

References Cited in the file of this patent

UNITED STATES PATENTS

| | | |
|---|---|---|
| 396,906 | Westphal | Jan. 29, 1889 |
| 2,161,578 | Johnson | June 6, 1939 |
| 2,243,668 | Cash | May 27, 1941 |
| 2,311,668 | Kennedy | Feb. 23, 1943 |
| 2,634,033 | Meyer | Apr. 7, 1953 |
| 2,653,378 | Esak | Sept. 29, 1953 |